Jan. 10, 1928.

K. BAUMANN 1,655,588

SAWING MECHANISM ADAPTED TO OPERATE WITH ROTATING MATERIAL

Filed Nov. 16, 1922      2 Sheets-Sheet 1

INVENTOR.
Karl Baumann
BY
Fay Oberlin & Fay
ATTORNEYS

Jan. 10, 1928.

K. BAUMANN 1,655,588

SAWING MECHANISM ADAPTED TO OPERATE WITH ROTATING MATERIAL

Filed Nov. 16, 1922    2 Sheets-Sheet 2

INVENTOR.
Karl Baumann

By Fay, Oberlin & Fay
ATTORNEYS

Patented Jan. 10, 1928.

1,655,588

UNITED STATES PATENT OFFICE.

KARL BAUMANN, OF MUNICH, GERMANY, ASSIGNOR TO THE AJAX MANUFACTURING COMPANY, OF CLEVELAND, OHIO, A CORPORATION OF OHIO.

SAWING MECHANISM ADAPTED TO OPERATE WITH ROTATING MATERIAL.

Application filed November 16, 1922, Serial No. 601,264, and in Germany April 24, 1922.

This invention relates to a driving arrangement for cutting off saws, especially bow-saws, in which the invariable cutting speed, acting on the rotating material, is derived from the saw bow, and relates further to a stopping device, which permits sawing off of round, square or otherwise shaped material.

Figure 1:
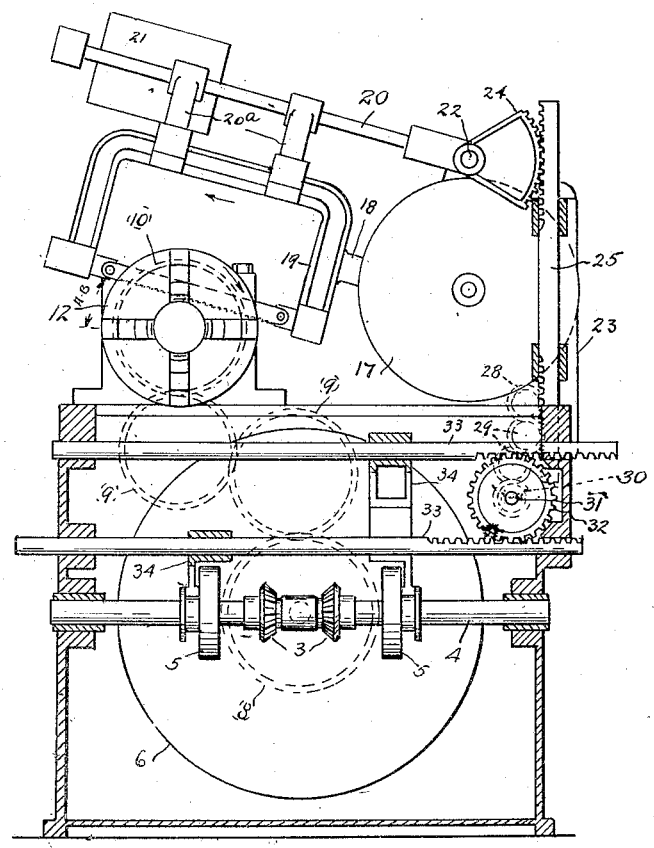
Figure 2:
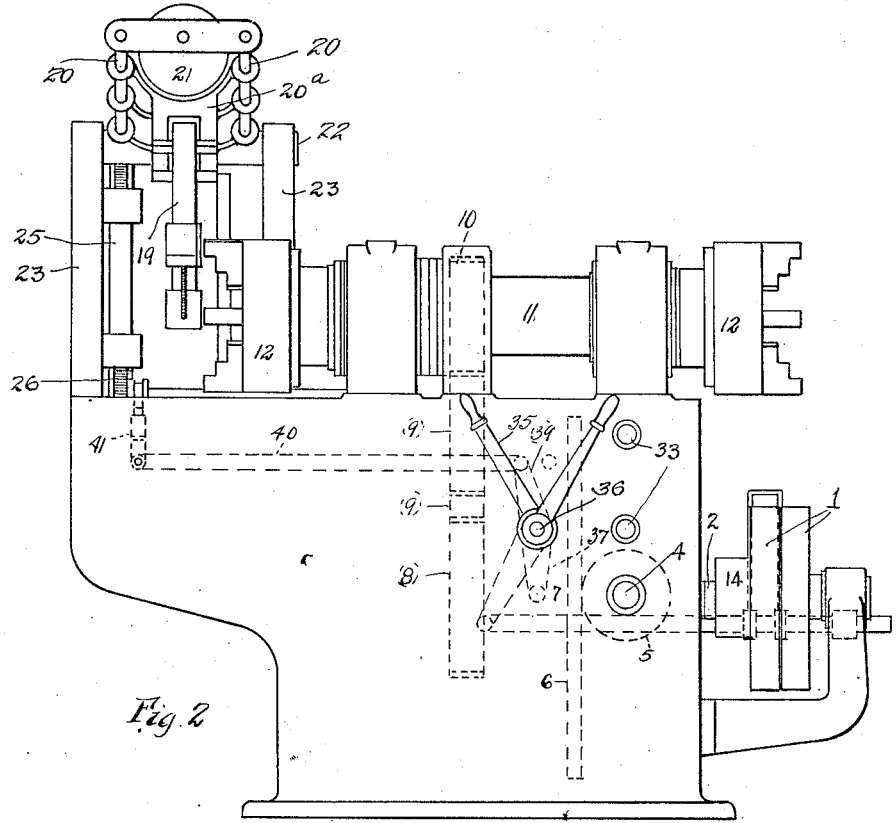
Figure 3:
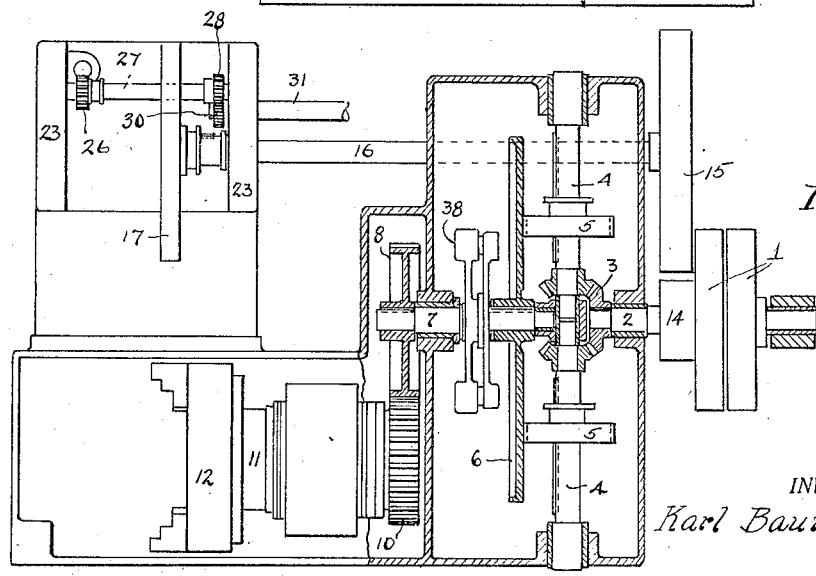

In the accompanying drawing, in which one form of construction of my improved device is illustrated, Fig. 1 represents a side view, partly in section, Fig. 2 is a front view and Fig. 3 a plan view, partly in section, of the subject matter of the application.

The driving power for operating the cutting off saw is transmitted to the pulley 1, which is keyed to the shaft 2, and thence by means of a bevel gear wheel drive to a separate shaft 4, which carries two friction wheels 5. These friction wheels are in engagement with a friction disk 6, supported on the shaft 7, so that the latter and the gear wheel 8, keyed to it, are rotated. The gear wheel 8, through the intermediate gear wheels 9, drives the gear wheel 10, which is rigidly secured to the hollow shaft 11, so that the material, which is not shown but which it will be understood is mounted between the chucks 12 of two adjacent machines or between one such chuck and an opposed tail support in familiar manner is caused to rotate.

The pulley 14 is keyed to the shaft 2 and drives by means of a belt the pulley 15 and therewith the shaft 16, to which the cam plate 17 is keyed, so that the driving rod 18 and the bow and saw 19 are caused to perform a reciprocating movement.

The bow 19 with the rods 20 and the bearings 20ª whereby said bow is reciprocably mounted on said rods and also with the weight 21 is rigidly secured to the shaft 22, which latter is rotatably mounted in the bearing bracket 23.

On account of the own weight of the parts, indicated by the reference numerals 19, 20 and 21, it is possible for the bow and saw 19 to perform the movement, indicated in the drawing by the line A—B.

By means of the movement of the parts 19, 20 and 21 in the direction B—A of Fig. 1, as the cutting operation proceeds and the saw correspondingly drops or changes in its angular position, the shaft 22, to which the toothed segment 24 is keyed, is caused to rotate, said toothed segment being in mesh with the rack-bar 25, so that the latter is raised. This rack-bar 25 is in engagement with the gear wheel 26, which is caused to rotate by the upward movement of said rack-bar. The gear wheel 26 is shiftably mounted on the shaft 27, so that the latter drives the gear wheel 28 and by means of the intermediate gear wheels 29, also the gear wheel 30. The latter is keyed to the shaft 31 and accordingly operates the gear wheel 32, which meshes with the two rack-bars 33 and causes the same to perform a shifting movement in opposite directions. To the two rack-bars 33 are rigidly secured the two jaw-levers 34, which are in engagement with the friction wheels 5.

On account of the uniform shifting movement of the rack-bars 33 the jaw-levers 34 and accordingly the friction wheels 5 too are shifted towards the center of the friction disk 6, whereby the uniformly increasing number of revolutions and accordingly the invariable cutting velocity, acting on the material to be sawed off, is obtained.

With the before described driving arrangement material of round cross-section can be sawed off in a satisfactory manner.

However in order to render it possible, to saw off material of different, e. g. angular cross-sections, it is necessary that the hollow shaft 11 be at a standstill. In other words, while in sawing round material the saw and bow need travel only through the arc B—A (Fig. 1) with materials of angular cross-section, the saw will require to drop double the distance thus indicated in order to completely sever the article. This obviously would require doubling the diameter of the friction disc 6 and an unnecessary double shifting movement of the friction wheels 5 and so would result in an increased expense in the construction of the whole apparatus.

In order to avoid this, the diameter of the friction disk 6 has only such a size as is necessary for sawing off rotating material. However with stationary or non-rotating material the two friction wheels, on account of the increased distance through which the saw and bow 19 must drop, would come in engagement with the bevel gear 3, when only a half of the cross sectional area of the material is sawed off, and this would necessarily result in a breakage of some parts of the machine.

In order to avoid such a breakage, a stopping device is provided on the apparatus, the operation of which is as follows:

The stopping device is operated by means of the hand lever 35, which is secured to the shaft 36, the latter having in rigid connection the lever 37, which engages by means of its claws with the resiliently arranged pressure disk 38 (see Fig. 3). By means of the manually effected movement of the lever 35 from the left to the right hand the lever 37 is moved from the right to the left hand and accordingly the friction disk 6, which is still under spring pressure, is released, so that the shaft does not receive any further rotating movement; thereby the hollow shaft 11 and the material mounted between the chucks 12 comes to a standstill.

By the movement of the lever 35 from the left to the right hand the lever 39, which too is rigidly connected to the shaft 36, is moved also from the left to the right hand. This movement is transmitted by means of the rod 40 upon the angle lever 41 and accordingly the gear wheel 26, which is shiftably mounted on the shaft 27, is caused to disengage from the rack-bar 25. Thereby an independent downward movement of the saw and bow beyond the course A—B is insured.

The arrows, shown in Fig. 1, indicate the direction of the rotation of the material and the direction of the operation of the saw.

As a result of the automatic adjustment of the relative rates of reciprocation of the saw and of rotation of the work, specifically by speeding up the rotation of the work as the cutting operation proceeds and the diameter of the work at the cut is correspondingly reduced, it will be seen that the saw may be operated at all times at maximum efficiency. In other words, the rate of rotation of the work is varied to keep the circumferential speed under the saw approximately uniform. In addition, my improved machine is readily adaptable for operating upon a stationary piece of work as may be necessary where the article is of polygonal or other angular shape in cross-section.

Having thus described the nature of my invention, what I claim as new and desire to secure by Letters Patent of the United States is:

1. In a method of sawing metal and like articles, wherein a reciprocatory saw is employed, the step which consists in rotating the article as the saw reciprocates, and progressively varying the relative rate of such rotation and reciprocation in accordance with the angle of the saw to the axis of the rotating article.

2. In a method of sawing metal and like articles, wherein a reciprocatory saw is employed, the step which consists in rotating the article as the saw reciprocates, and progressively varying the rate of rotation in accordance with the angle of the saw to the axis of the rotating article.

3. In mechanism of the character described, the combination with rotary work-holding means; of a reciprocatory saw; and means controlled by the angular position of said saw adapted to vary the relative rates of reciprocation of said saw and of rotation of the work.

4. In mechanism of the character described, the combination with rotary work-holding means; of a reciprocatory saw; and means controlled by the angular position of said saw adapted to compensatively determine the rate of rotation of the work.

5. In mechanism of the character described, the combination with rotary work-holding means; of a transversely extending support angularly adjustable about an axis parallel with that of the work; a saw reciprocably mounted on said support; and means for driving said work-holding means and reciprocating said saw, said driving means for the work-holding means including a variable speed device and said device being operatively connected with said support.

6. In mechanism of the character described, the combination with rotary work-holding means; of a transversely extending support angularly adjustable about an axis parallel with that of the work; a saw reciprocably mounted on said support; means for reciprocating said saw; a variable speed friction device for rotating said work-holding means; and connections between said drive and saw-support whereby the angular position of the latter determines the speed of the work-holding means.

7. In mechanism of the character described, the combination with rotary work-holding means; of a transversely extending support angularly adjustable about an axis parallel with that of the work; a saw reciprocably mounted on said support; means for reciprocating said saw; a variable speed friction device for rotating said work-holding means, said drive including a disk and a wheel movable across the face of said disk; a rack connected with said wheel thus to move the same; and a pinion meshing with said rack and connected with said saw-support so as to be rotated upon change in the angular position thereof.

8. In mechanism of the character described, the combination with rotary work-holding means; of a transversely extending support angularly adjustable about an axis parallel with that of the work; a saw reciprocably mounted on said support; means for driving said work-holding means and reciprocating said saw, said driving means including a variable speed device and said device being operatively connected with said support; and means adapted simultaneously to throw said driving means out of gear and to disconnect said variable speed device.

9. In mechanism of the character described, the combination with rotary work-holding means; of a transversely extending support angularly adjustable about an axis parallel with that of the work; a saw reciprocably mounted on said support; means for reciprocating said saw; a variable speed friction device for rotating said work-holding means; connections between said drive and saw-support whereby the angular position of the latter determines the speed of the work-holding means; and means adapted simultaneously to throw said drive out of gear and to break said connections.

In testimony whereof I affix my signature.

KARL BAUMANN.